(12) United States Patent
Beuke et al.

(10) Patent No.: US 7,550,033 B2
(45) Date of Patent: Jun. 23, 2009

(54) PROCESS FOR REMOVING SULFIDES

(75) Inventors: Samuel Henry Beuke, Houston, TX (US); Richard Sadok, Ponca City, OK (US); Alfred Keller, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/054,006

(22) Filed: Jan. 21, 2002

(65) Prior Publication Data
US 2003/0136263 A1    Jul. 24, 2003

(51) Int. Cl.
*B01D 53/14* (2006.01)
(52) U.S. Cl. .............................. 95/235; 95/181; 95/237
(58) Field of Classification Search .................. 95/235, 95/237, 156, 181; 96/243, 290
See application file for complete search history.

(56) References Cited

U.S. PATENT DOCUMENTS

| | | | | |
|---|---|---|---|---|
| 1,578,687 A | * | 3/1926 | Sperr, Jr. | |
| 1,785,365 A | * | 12/1930 | Seil | |
| 2,384,378 A | * | 9/1945 | Hooker et al. | |
| 3,748,827 A | * | 7/1973 | Bulian et al. | |
| 4,020,144 A | * | 4/1977 | Bosniack | |
| 4,088,735 A | * | 5/1978 | Bratzier et al. | |
| 4,191,732 A | * | 3/1980 | Uraneck et al. | |
| 4,233,141 A | * | 11/1980 | Beavon et al. | |
| 4,604,107 A | * | 8/1986 | Burr | |
| 4,696,688 A | * | 9/1987 | Mehra | |
| 4,797,140 A | * | 1/1989 | Landeck et al. | |
| 5,039,398 A | | 8/1991 | Stine et al. | |
| 5,429,667 A | * | 7/1995 | ebner et al. | |
| 5,961,819 A | | 10/1999 | Lee et al. | |

OTHER PUBLICATIONS

MeriChem website information, printed Nov. 24, 2001.
UOP Press Release, printed Nov. 24, 2001.

* cited by examiner

*Primary Examiner*—Jason M Greene

(57) ABSTRACT

A method for removing organic sulfur compounds from a vent gas is described. Also described is an apparatus for absorbing organic sulfur compounds from vent gas.

25 Claims, 1 Drawing Sheet

US 7,550,033 B2

PROCESS FOR REMOVING SULFIDES

FIELD OF THE INVENTION

The present invention relates to processes for removing organic sulfur compounds from a vent gas. More specifically, the present invention provides several techniques for the extraction of organic sulfur compounds such as sulfides, including disulfide oils, from a vent gas using a liquid hydrocarbon stream.

BACKGROUND OF THE INVENTION

Many hydrocarbon streams have sulfur-containing compounds as components. These sulfur-containing compounds may make the hydrocarbon stream "sour," often viewed as undesirable in the industry. One class of the most common form of sulfur-containing compounds present in the hydrocarbon streams is mercaptans, designated R—S—H. R is commonly a light hydrocarbon radical such as a methyl or ethyl group. Mercaptans generally concentrate in hydrocarbon liquid streams during separation in a processing facility.

Various processes have been used to remove sulfur-containing compounds such as mercaptans. Two of the most common processes are the UOP MEROX™ extraction process and the MERICHEM THIOLEX$^{SM}$ REGEN$^{SM}$ process. In the MEROX™ extraction process, the mercaptans are removed in a multistage extraction contactor using high efficiency trays. A caustic regeneration section then converts the extracted mercaptans to disulfide oils, via an air/catalyst oxidation reaction, which are then separated and removed in a disulfide separator vessel. The THIOLEX$^{SM}$ REGEN$^{SM}$ process is similar, except that in the place of the multistage contactor, the THIOLEX$^{SM}$ REGEN™ process uses a fiber bundle to facilitate contact between the caustic stream and the hydrocarbon stream.

Air is often used for oxidizing the mercaptans to disulfide oils. The unreacted dissolved components of the air stream, i.e., primarily nitrogen and other inert gases and oxygen, are normally separated from the caustic and disulfide oils. The disulfide separator vessel allows the unreacted air components to exit in a vent gas stream. This vent gas stream contains primarily air, and small amounts of water, hydrocarbons, and disulfide oils. Because of the presence of disulfide oils, this vent gas is often treated as a waste, which often triggers various state and national regulations for treatment and handling. When vented to the atmosphere directly or incinerated, the amount of sulfur-containing compounds emitted from these processes are normally enough to require permitting and/or various other state and national agency oversight actions. Some operators of these plants have attempted to avoid this result by routing this vent gas through an activated carbon bed. This activated carbon must be replaced or regenerated after having absorbed its limit of sulfur-containing compounds. It is then often necessary to dispose of the spent activated carbon, typically as a hazardous waste. In addition, to avoid unit shutdown while these carbon beds are either regenerated or replaced, an operator will most often have a backup carbon bed to remove the sulfur-containing compounds when the primary carbon bed is regenerated or replaced.

SUMMARY OF THE INVENTION

Accordingly, in one embodiment of the present invention, a method of removing organic sulfur compounds from a vent gas stream is described. The vent gas stream is contacted with a liquid hydrocarbon stream, and a portion of the organic sulfur compounds are absorbed from the vent gas stream into the liquid hydrocarbon stream to form an exiting vent gas stream.

In another embodiment of the present invention, a method for removing organic sulfur compounds from a vent gas stream having organic sulfur compounds is described. In this embodiment, a scrubber with a shell is provided. The scrubber shell has an interior cavity, a diameter, a vent gas entry port, a vent gas exit port, and a hydrocarbon entry port. A hydrocarbon stream is introduced into the scrubber through the hydrocarbon entry port. The vent gas stream is then introduced into the scrubber through the vent gas entry port. A portion of the organic sulfur compounds is absorbed from the vent gas stream into the hydrocarbon stream to form an exiting vent gas stream. Finally, the exiting vent gas stream is removed from the scrubber through the vent gas exit port.

In still another embodiment of the present invention, a method for removing disulfide oils is described. In this embodiment, a scrubber with a shell is provided. The scrubber shell has an interior cavity, a diameter, a vent gas entry port, a vent gas exit port, and a hydrocarbon entry port. The scrubber shell also has gas/liquid contact material that is located within the interior cavity of the scrubber. A hydrocarbon stream is introduced into the scrubber through the hydrocarbon entry port. The hydrocarbon stream has a least one liquid hydrocarbon that boils between about 180° F. and about 430° F. The vent gas stream is then introduced into the scrubber through the vent gas entry port. A portion of the disulfide oils are absorbed from the vent gas stream into the hydrocarbon stream to form an exiting vent gas stream. Finally, the exiting vent gas stream is removed from the scrubber through the vent gas exit port.

DETAILED DESCRIPTION OF THE INVENTION

Figure 1:
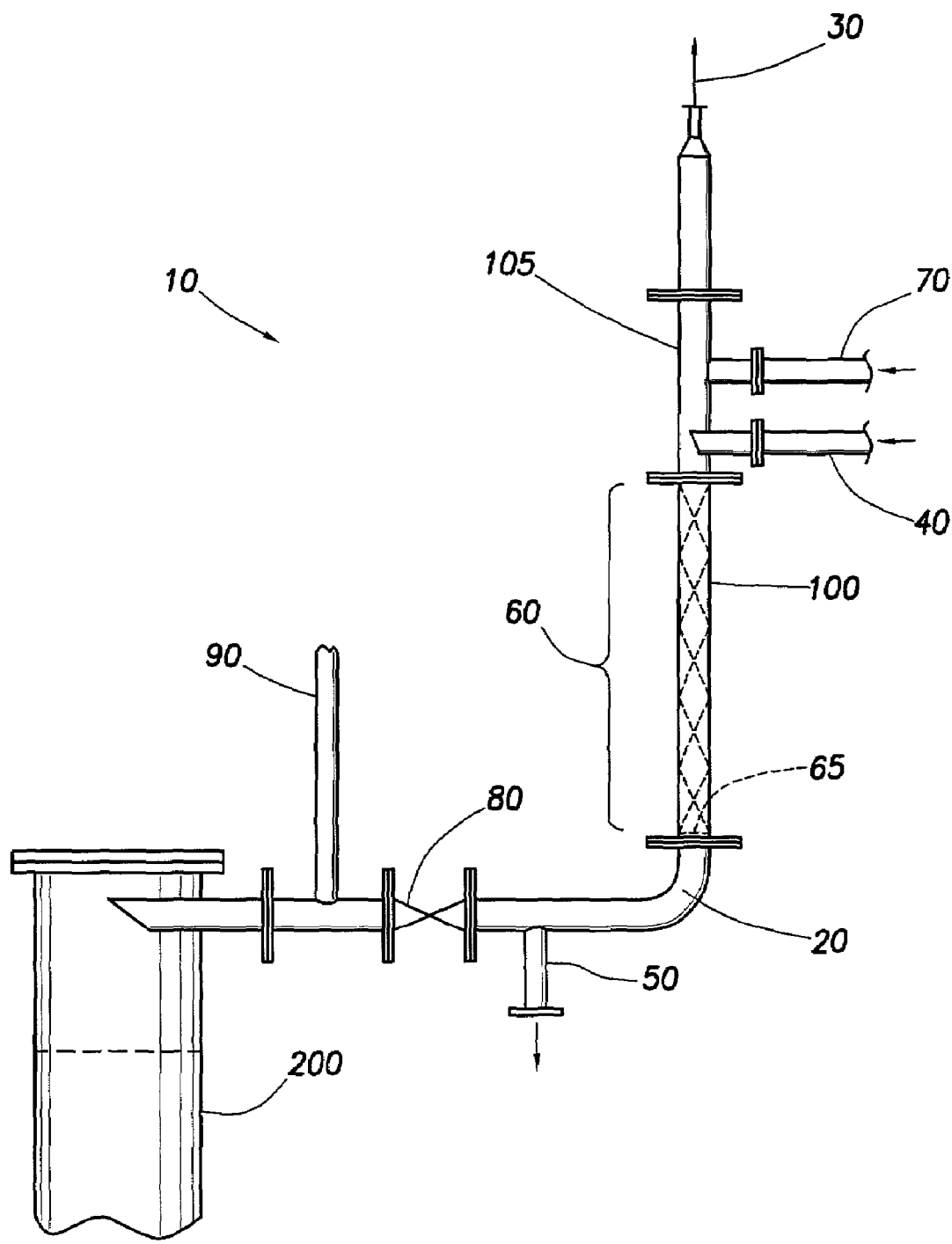
FIG. 1 is a schematic of a vent gas scrubber for removal of organic sulfur compounds from vent gas according to one embodiment of the present invention.

In one embodiment of the present invention, a portion of the organic sulfur compounds present in an incoming vent gas stream are removed through the use of a scrubber. This scrubber removes sulfides, such as disulfide oils, from the vent gas by absorbtion into a liquid hydrocarbon stream. The sulfides-depleted vent gas may then be routed to the atmosphere, a heater, or an incinerator or other control device, and the liquid hydrocarbon stream may then be treated to remove the sulfur, typically, but not manditorily, in a treater such as a hydrotreater, wherein the sulfur is recovered.

According to one embodiment of the present invention, as shown in FIG. 1, scrubber 10 is a vertically-oriented, gas-liquid contactor where vent gas and a liquid hydrocarbon stream are commingled. Other orientations, including horizontal, are possible. Scrubber 10 is most often roughly cylindrical, with an interior cavity. The liquid hydrocarbon stream consists of one or more liquid hydrocarbons. This stream should have a high affinity for absorbtion of the particular organic sulfur compounds present in the vent gas stream. Where more than one liquid hydrocarbon is used in the liquid hydrocarbon stream, the overall mixture should be one capable of absorbing the organic sulfur compound present within the vent gas stream. Typically this hydrocarbon stream will be primarily composed of a gasoline boiling range (180° F. to 430° F.) and should contain less than 50 ppm total sulfur and more preferably below 10 ppm total sulfur. Examples of such compounds include benzene, xylene, toluene, hexane, heptane, octane, nonane, and mixtures of hydrocarbons, including hydrogenated naphtha. Any hydrocarbon capable of efficiently absorbing the particular sulfur compounds, either by itself or in combination with other hydrocarbon components may be used.

In the embodiment depicted in FIG. 1, scrubber 10 consists primarily of shell 100, which may be constructed out of typical materials used in the manufacture of industrial equipment, often carbon or stainless steel, although certain ceramics and exotic metals such as INCONEL alloys, including INCONEL alloy 625, able to withstand the conditions associated with scrubber, are appropriate as well. Where scrubber 10 is exposed to high levels of caustic or caustic salts, it is generally not desirable to use carbon steel on process-wetted parts, unless the carbon steel is lined with a suitable noncorrosive material such as rubber, glass, or ceramic. Shell 100 is most commonly a section of piping. Vent gas enters scrubber 10 through vent gas entry point 20. The vent gas may be composed of the following components, although scrubber 10 is capable of handling any vent gas stream where the sulfides are a minor component:

| Component | Range (all ranges in mole %) |
|---|---|
| Nitrogen | 70-90 |
| Oxygen | 0-21 |
| Water | 0-8 |
| Hydrocarbons | 0-10 |
| Disulfide Oils | 0-2 |
| Mercaptans | trace |
| Sodium Thiosulfate | trace. |

The vent gas then rises through scrubber 10 where it is contacted by a falling liquid hydrocarbon stream. The exiting vent gas stream leaves scrubber 10 through vent gas exit port 30. While vent gas entry point 20 and vent gas exit port 30 are shown at the bottom and top of scrubber 10, this is not limiting, and either or both could be located along the circumference of scrubber 10.

The liquid hydrocarbon stream is introduced to scrubber 10 through hydrocarbon entry point 40. In order to facilitate even dispersal through scrubber 10, scrubber 10 is generally outfitted with a distributor in functional proximity to hydrocarbon entry port 40, often within spool piece 105, located below hydrocarbon entry point 40. The liquid hydrocarbon stream falls through the interior of scrubber 10 where it contacts the rising vent gas stream, absorbing a portion of the sulfur compounds within the vent gas stream. The absorbed sulfur compounds and the liquid hydrocarbon stream may then either drain into separator 200, which may be a disulfide separator, or may be removed through hydrocarbon drain 50. When the liquid hydrocarbon stream and absorbed sulfur compounds are removed from scrubber 10 through hydrocarbon drain 50, they are typically collected in a drum or other vessel for later treatment such as in a hydrotreater.

Most of the absorbtion of sulfur compounds by the liquid hydrocarbon stream occurs within contact zone 60 of scrubber 10. Contact zone 60 is designed to maximize the contact between the falling hydrocarbon stream and the rising vent gas. Various gas/liquid contact materials may be used to facilitate this contact; examples include packing, fiber/film contactors, and tray assemblies. The most common means is through packing, which is depicted in FIG. 1. The packing within contact zone 60 may be of any type designed for liquid/gaseous contact, but should be of a type that is resistant to plugging, as some sulfides such as disulfide oils may congeal and plug holes in the packing and other components within the vent gas stream or hydrocarbon stream may present a similar plugging issue. This plugging will result in column inefficiencies and reduce the overall effectiveness of scrubber 10. One of the common types of packing used in liquid/gas services is ring packing, such as nutter or raschig rings, which are suitable for use in this application as long as the diameter of the packing is properly chosen. Other types of packing are acceptable, including structured packing. Further, other means of developing contact between the hydrocarbon and rising vent stream are acceptable, including fiber/film contactors and trayed systems, as long as the proper contact area is obtained. Determining the proper contact area for the system is within the capability of one of ordinary skill in the art using traditional methods.

When ring packing is used, typical sizes of packing range from ½" to 2", depending on operator need. Smaller rings are more prone to plugging, but offer greater surface contact per foot of packing and therefore a smaller overall scrubber 10. One of ordinary skill in the art is capable of evaluating this tradeoff. An operator may change the amount of contact area available for vent gas/hydrocarbon stream contact by altering the height of the packing, packing size, and/or scrubber 10 diameter depending on his need. Scrubber 10 diameter may also be increased in order to avoid flooding at the expected highest flow rates, a condition that will result in decreased efficiency of scrubber 10. Typically, scrubber 10 diameter will be between 6" and 24", although smaller or larger sizes may be used, depending on throughput and the efficiency desired. The material of construction of the packing may be of any material chemically compatible with the vent gas stream and the liquid hydrocarbon stream, as long as it is also able to handle the mechanical stresses within scrubber 10. The packing is most commonly composed of carbon steel, stainless steel, carbon, or ceramic. The packing is generally supported, such as by packing support 65 as shown in FIG. 1.

With proper choice of the packing and contact area available for absorption, an operator may obtain removal efficiencies of sulfur from the vent stream of greater than 99%, most often greater than 99.5%. This efficiency may degrade with service of scrubber 10, as sulfides and other contaminants such as salts from a caustic system will inevitably plug the contact area of the packing. It is often advantageous to design scrubber 10 with a means for cleaning. As shown in FIG. 1, scrubber 10 may be designed with cleaning port 70. When the efficiency of scrubber 10 drops below a certain predetermined level, it may be isolated, such as by closing isolation valve 80, and filling scrubber 10 with a solution designed to remove the congealed disulfide oils and salts from the packing within contact area 60. The solution may be removed through hydrocarbon drain 50. It is generally preferred to clean the packing with a heated solution, such as for instance condensate. After cleaning, scrubber 10 may be returned to service by opening isolation valve 60. During cleaning, the vent gas stream may be routed around scrubber 10 through bypass 90.

FIG. 1 depicts the mounting of scrubber 10 on the top of separator 200. This mounting facilitates the removal of the vent gas from separator 200. However, depending on physical constraints or other operator needs, scrubber 10 may be mounted adjacent to or remotely from separator 200. Further, scrubber 10 is versatile enough that it may receive its vent gas stream from other equipment or processes capable of delivering a vent stream containing disulfide oils or sulfides.

Although the present invention has been described with reference to specific details, it is not intended that such details should be regarded as limitations upon the scope of the invention, except as and to the extent that they are included in the accompanying claims.

What is claimed is:

1. A method for removing organic sulfur compounds from a vent gas stream wherein said vent gas stream comprises air, said method comprising the following steps:
   contacting the vent gas stream with liquid hydrocarbon stream; and
   absorbing a portion of the organic sulfur compounds from the vent gas stream into the liquid hydrocarbon stream to form an exiting vent gas stream.

2. The method as described in claim 1, wherein the liquid hydrocarbon stream comprises one or more liquid hydrocarbons.

3. The method as described in claim 2, wherein the hydrocarbon stream comprises two or more liquid hydrocarbons.

4. The method as described in claim 1, wherein at least one of the liquid hydrocarbons having a boiling point of between about 180° F. and about 430° F.

5. The method as described in claim 4, wherein the at least one of the liquid hydrocarbons comprises a compound selected from the group consisting of benzene, xylene, toluene, hexane, heptane, octane, nonane, and mixtures thereof.

6. The method as described in claim 4, wherein said at least one of the liquid hydrocarbons comprises a hydrogenated naphtha.

7. The method as described in claim 1, wherein the sulfur concentration of the exiting vent gas stream is less than one percent of the sulfur concentration of the vent gas stream.

8. The method as described in claim 7, wherein the sulfur concentration is less than 0.5% of the sulfur concentration of the vent gas stream.

9. The method of claim 1 further comprising hydrotreating the hydrocarbon stream.

10. The method of claim 1 further comprising routing the exiting vent gas stream to an incinerator or a heater.

11. The method of claim 1, wherein the organic sulfur compound removed is a sulfide.

12. The method of claim 11, wherein the organic sulfur compound removed is a disulfide oil.

13. A method for removing organic sulfur compounds from a vent gas stream having organic sulfur compounds, wherein said vent gas stream comprises from 70 to 90 percent nitrogen, the vent gas stream further having an initial organic sulfur compound concentration, comprising the following steps:
   (a) providing a scrubber, the scrubber having a shell, the shell having an interior cavity, a diameter, a vent gas entry port, a vent gas exit port, and a hydrocarbon entry port;
   (b) introducing a hydrocarbon stream into a scrubber through the hydrocarbon entry port;
   (c) introducing the vent gas stream into the scrubber through the vent gas entry port;
   (d) absorbing a portion of the organic sulfur compounds from the vent gas stream into the hydrocarbon stream to form an exiting vent gas stream; and
   (e) removing the exiting vent gas stream from the scrubber through the vent gas exit port.

14. The method of claim 13, wherein the scrubber further comprises gas/liquid contact material, the gas/liquid contact material within the interior cavity of the scrubber.

15. The method of claim 14, wherein the gas/liquid contact material comprises a material selected from the group consisting of packing, trays, and fiber film contactor.

16. The method of claim 15, wherein the gas/liquid contact material comprises a material selected from the group consisting of structured packing and ring-shaped packing.

17. The method of claim 16, wherein the gas/liquid contact material comprises a material selected from the group consisting of raschig rings and nutter rings, said rings having a diameter.

18. The method of claim 17, wherein the said rings are comprised of a material selected from the group consisting of carbon steel, stainless steel, carbon, and ceramic.

19. The method of claim 17, wherein said rings have a nominal diameter of between ½" and 2".

20. The method of claim 14, wherein the scrubber further comprises a packing support, wherein the packing support is located within the interior cavity of the shell and is able to support the gas/liquid contact material.

21. The method of claim 13, wherein the diameter of the shell is between about 6" and 24".

22. The method of claim 13, wherein the shell comprises a material selected from the group consisting of carbon steel, stainless steel, and ceramic.

23. The method of claim 13, wherein the scrubber further comprises a liquid distributor, the liquid distributor located within the interior cavity of the shell and in the same plane as the diameter of the shell, the liquid distributor further being within functional proximity of the hydrocarbon entry port.

24. The method of claim 13, wherein the vent gas entry port of the scrubber is mounted on a disulfide separator.

25. A method for removing disulfide oils from a vent gas stream having disulfide oils, comprising the following steps:
   (a) providing a scrubber, the scrubber having a shell, the shell having an interior cavity, a diameter, a vent gas entry port, a vent gas exit port, a hydrocarbon entry port, and gas/liquid contact material, the gas/liquid contact material located within the interior cavity of the scrubber;
   (b) introducing a hydrocarbon stream into the scrubber through the hydrocarbon entry port, the hydrocarbon stream comprising at least one hydrocarbon, the at least one hydrocarbon having a boiling point of between about 180° F. and about 430° F.;
   (c) introducing the vent gas stream into the scrubber through the vent gas entry port;
   (d) absorbing a portion of the disulfide oils from the vent gas stream into the hydrocarbon stream to form an exiting vent gas stream; and
   (e) removing the exiting vent gas stream from the scrubber through the vent gas exit port.

* * * * *